Nov. 23, 1965 I. J. MAZZIOTTI ETAL 3,219,744
RADAR SIGNAL INTERFERENCE TRAINER
Filed Aug. 26, 1963 6 Sheets-Sheet 3

FIG. 1c

INVENTORS
ISIDORE J. MAZZIOTTI
SEYMOUR SCHNEIDER
BY
Laurence S. Epstein

United States Patent Office 3,219,744
Patented Nov. 23, 1965

3,219,744
RADAR SIGNAL INTERFERENCE TRAINER
Isidore J. Mazziotti, Mineola, and Seymour Schneider,
Bayside, N.Y., assignors, by mesne assignments, to the
United States of America as represented by the Secretary of the Navy
Filed Aug. 26, 1963, Ser. No. 304,705
7 Claims. (Cl. 35—10.4)

This invention relates to a radar interference training system and to a keyer circuit and associated circuitry used therewith for modulating a backward-wave oscillator which may be utilized in such a training system or with a radar transmitter.

The invention relating to the portion of the radar interference training system has particular value in training radar personnel in dejamming procedures without incapacitating an associated radar set or sets used in this interference training system during a training operation. This results because there are no physical connections between the trainer and the radar set used in conjunction therewith. This is of great value in training radar operators at the operational level or in the field where, with very short notice, the radar may have to be used for tracking an unidentified or enemy target. This is accomplished by merely turning off the radar trainer. Such a system is of particular value in keeping experienced radar operators proficient in interference or anti-jamming techniques without necessitating their removal from the radar set to which they are assigned. The trainer may also be used in a classroom training situation with an associated radar set having a plurality of display repeaters or indicators. Ordinarily, when used in the field, it is not as easy for the instructor to directly observe the trainee's anti-jamming techniques while operating the trainer due to the limitation of distance between them. In such a case auxiliary communication between the instructor and the trainee will be required in order to facilitate the instructor's correction of the trainee's de-jamming procedures, if required. A real or pulse simulated target is required during training operations.

An object of the radar interference training system therefore, is to provide a means for training radar operators in de-jamming techniques without affecting the battle or readiness capabilities of the associated radar used therewith during a training operation.

A further object is to provide an improved radar antijamming training system.

The portion of the invention relating to the keyer circuit and associated circuitry used therewith for frequency and amplitude modulating a backward-wave oscillator referred to as a "keyer system," has particular value in achieving accurate simulated amplitude modulated jamming signals without accompanying frequency shift ordinarily resulting from conventional amplitude modulation of a backward-wave oscillator. Similarly frequency modulation of a backward-wave oscillator, referred to as a "b-w o," without any change, is achieved in the amplitude of the output carrier wave signal generated by the backward-wave oscillator. Further, the means utilized to achieve such results require lower voltage power supplies than would ordinarily be required in such a keyer system.

An object of the keyer system therefore, is to provide an improved means for modulating a backward-wave oscillator without any resulting undesirable frequency or amplitude changes in the characteristic of the output carrier wave signal of the backward-wave oscillator used to simulate jamming signals.

Another object is to provide an improved system for modulating a backward-wave oscillator.

Another object is to provide a low voltage keyer system used to modulate a backward-wave oscillator.

A further object is to provide a simple low voltage keyer system.

Other objects and many of the attendant advantages of this invention will be readily appreciated as the same becomes better understood by reference to the following detailed description when considered in connection with the accompanying drawings wherein:

Each of the components depicted in block form relates to a function for which apparatus is well known in the art so it is believed unnecessary to provide detailed descriptions thereof.

General description—FIG. 1

With reference to the drawing in FIG. 1, the radar interference training system generally includes; a frequency and amplitude modulator A, a delay line power supply 62 coupled to the frequency modulation section of the modulator A, a keyer power supply 60 coupled at its input to the output of the delay line supply 62, a keyer B coupled at one of its inputs to the amplitude modulation section of the modulator A and also coupled at another of its inputs to the output of the keyer power supply 60, a radio frequency section C including a backward-wave oscillator 66, a conventional radar set D, and a sampling and detecting means including an audio amplifier means 78, a detector 80, and a mixer 74.

General operation—FIG. 1

In operation a particular type of jamming signal is chosen from those that are capable of being generated by the modulator A. If a type of amplitude modulation jamming signal is selected, that signal is directly coupled to the keyer B, which in turn varies the amplitude control voltage of the backward-wave oscillator 66 thereby changing the amplitude of the backward-wave oscillator's R.F. signal. In a similar manner when a frequency modulation jamming signal is selected a particular sweep voltage corresponding to the particular frequency modulation selected is coupled to the delay line power supply 62 thereby varying its output voltage which results in changing the frequency of the backward-wave oscillator's output signal, due to the inherent voltage tuning characteristic of a backward-wave oscillator. The resulting modulated radio frequency output signal, whether it be frequency or amplitude modulated, is propagated in a directive manner to the receiving antenna 72 of a conventional radar set D. Such output signal is also simultaneously sampled and compared with a sampled signal from the conventional radar set D to determine if their respective signals are substantially similar in carrier frequency. In addition a real or pulse simulated target is required during training operations.

Description and operation of the modulator—FIG. 1

With reference to the drawing in FIG. 1, the modulator A includes broadly, two sections. One is an "amplitude" modulation generation section providing sine, pulse, square and noise modulation signals, and the second is a frequency modulation section providing various forms of frequency modulation.

The "amplitude" modulation generator section of modulator A includes a frequency variable sine wave generator circuit, and more particularly a Weinbridge oscillator with a selectable bridge circuit consisting of a sine wave generator 2 and an inverter-amplifier 4. The sine wave output generated thereby is then directly fed to both the input of a square wave generator 6, such as a bi-stable multivibrator, thereby providing a square wave output, and to the modulation selector switch 42 through a potentiometer 8 used to vary the percent modulation of the resulting sine wave output. The output of the square wave generator 6 is then fed both to the modulation selector 42 and to a pulse amplifier 10. This may, for example, include a differentiator coupled to an input of an amplifier, and a rectifier coupled at the output of the amplifier (not shown). The square wave output from the square wave generator 6, in such a situation, is thus first differentiated, resulting in negative and positive voltage spikes, which are subsequently applied to the grid of the amplifier (not shown). The amplified output signals are then rectified thereby allowing only a positive trigger signal at the plate of the amplifier tube to be coupled to the input of the pulse generator 12. The pulse generator circuit 12 may consist of, for example, a conventional adjustable monostable multivibrator (not shown). The positive trigger signals from the pulse amplifier would then be applied to the grid of the normally non-conducting tube making up the monostable multivibrator. The resulting output pulses derived from the plate load of the normally non-conducting tube are varied in width by potentiometer 14 coupled to the grid of the normally conducting tube making up a section of the monostable multivibrator. These output pulses are then coupled to the rotary modulation selector switch 42.

Noise modulation signals are derived from a noise generator 16, which for example may consist of a gaseous triode tube surrounded by a two pole ring magnet (not shown). A magnetic field would then be created within the gas tube thereby altering the normal paths of conduction within the tube. The resulting noise from the noise generator 16 is coupled to a noise amplifier 18 and then to a cathode follower 20 which provides a high input-low output impedance. The resulting noise output signal from the cathode follower 20 is then coupled to the modulation selector switch 42 through a potentiometer 22 used to vary the modulation thereof.

External modulation from an external source is also coupled to the modulation selector switch 42 at terminal *a*. Continuous-wave interference signals would be the preferred type of external modulation used for interference training purpose.

Frequency modulation signals are generated by a variable sweeping circuit which provides a triangular output waveform to the delay line power supply 62 which causes the cathode to delay line voltage of the backward-wave oscillator 66 to be swept during frequency modulation operation. This results in frequency modulation of the output carrier wave signal of the backward-wave oscillator 66 because of its voltage tuned characteristic. The sweeping circuit consists of: a three hundred positive and negative voltage supply 24; a relay switching circuit 40 and a relay 38, alternately coupling 300 positive and negative volts to an operational integrator 25. The operational integrator 25 includes, a cathode follower 20 having part of its output directly fed back to the relay switching circuit 40, a miller integrator 28 having a variable resistive-capacitive network 26, a capacitive network coupled between a control grid of a miller integrator tube and the cathode element of a triode cathode follower (both not shown).

In operation, initially the relay switching circuit 40 is unenergized, and 300 negative volts are applied to the variable resistance-capacitance network 26 of the operational integrator 25 resulting in an output waveform at the cathode of the cathode follower 30 having a linear positive slope. As soon as this voltage, which is fed back to the relay switching circuit 40 which for example may consist of a parallel switching tube circuit, is sufficiently positive, the parallel switching tubes making up the relay switch, will be energized thereby energizing the relay 38 which in turn couples 300 positive volt D.C. directly to the RC network 26. This results in the waveform at the output of the cathode follower 30 now having a negative waveform. This voltage is in turn fed back to the relay switching circuit 40 thereby providing a resultant triangular waveform by the alternate energization and deenergization of the relay 38. Thus, a rectangular waveform is directly coupled by the relay switching action, to an operational integrator thereby producing at its output the desired triangular waveform, which is the result of integrating the rectangular waveform. This output triangular waveform (a sweep voltage), is then fed to a fixed-swept frequency switch 32. In the fixed frequency position *a* no voltage is seen at the output of the fixed-swept frequency switch 32 nor at the output of the overall sweeper circuit. In the swept position *b* the output voltage is applied through a rotary switch 36 which is used to select the desirable sector sweep. The sector sweep is changed by switching the position of the rotary switch 36, which is mechanically coupled to the RC timing network 26 of the operational integrator, thereby simultaneously changing the RC time constant of the operational integrator. Also the voltage amplitude of the output sweep frequency signal is varied by a swept frequency potentiometer 34 thereby effectively varying the selected swept frequency.

Figure 1A:
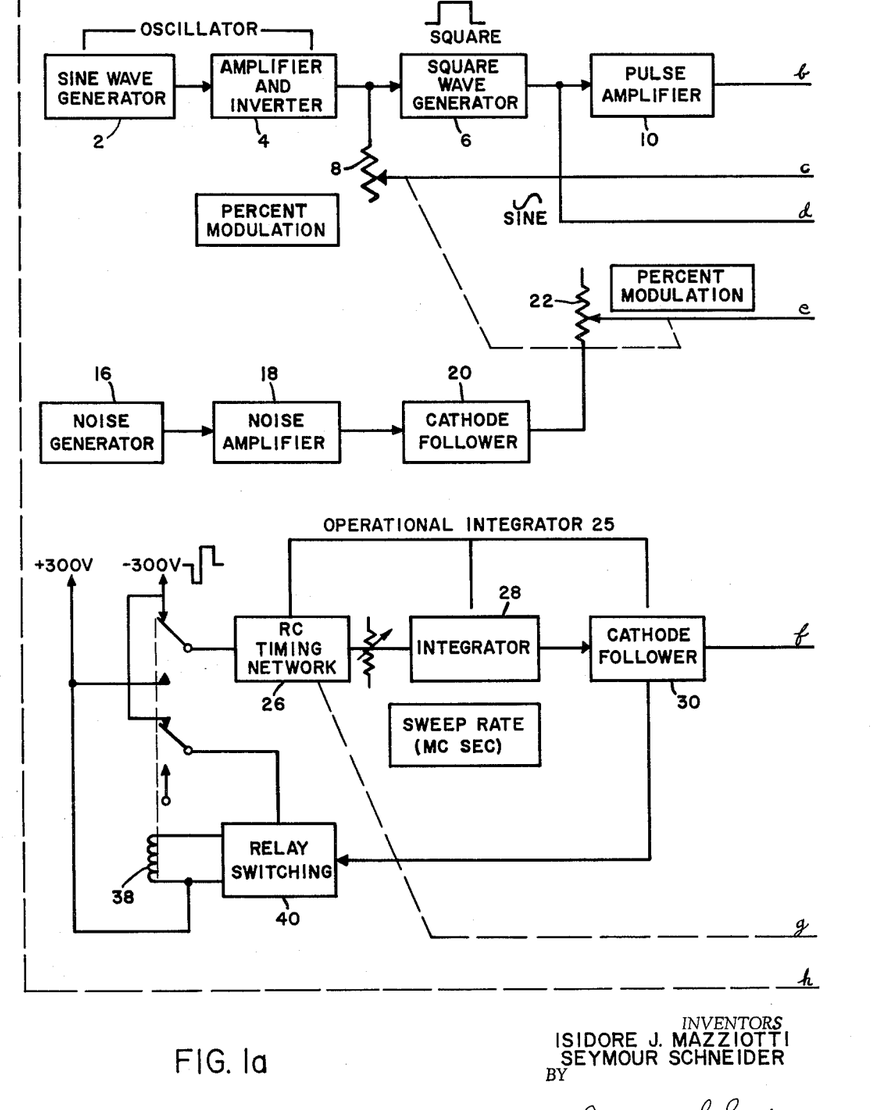
FIG. 1a–1d is a block diagram of one embodiment of the training radar interference training system invention.
Figure 1B:
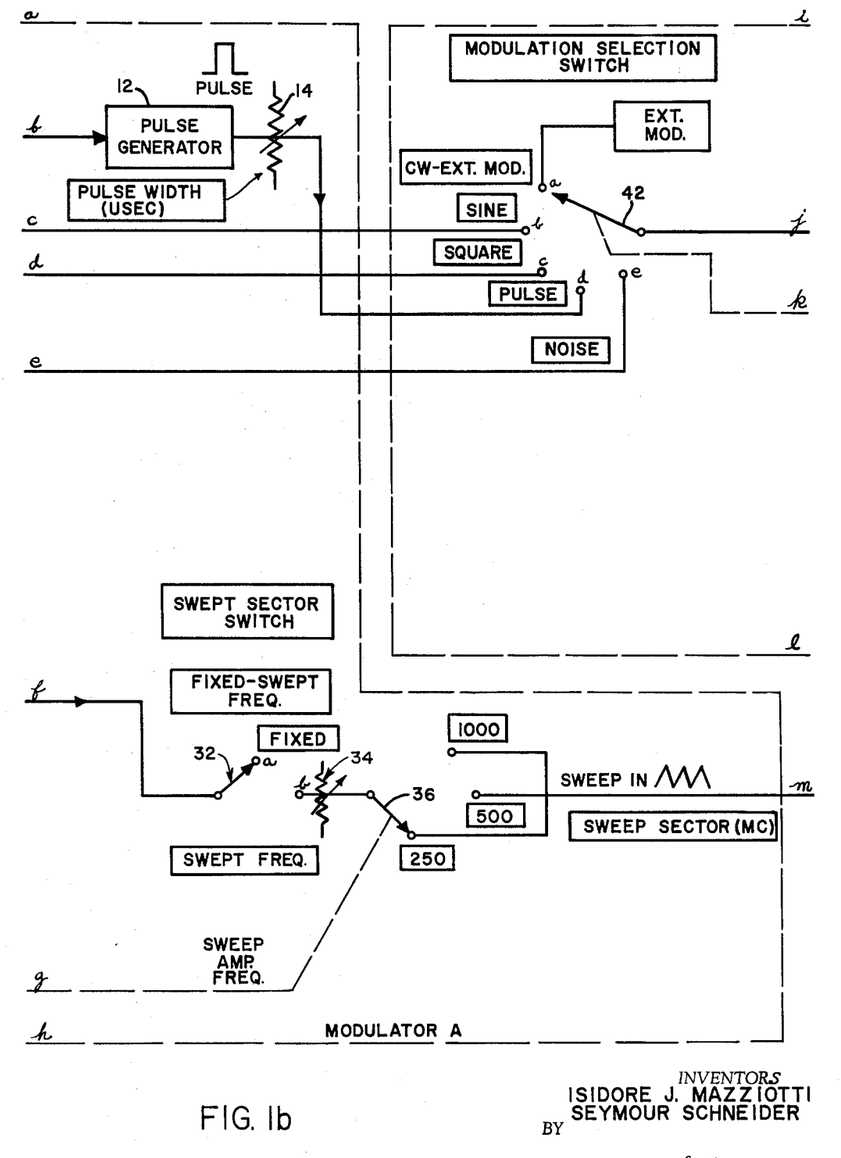
Figure 1C:
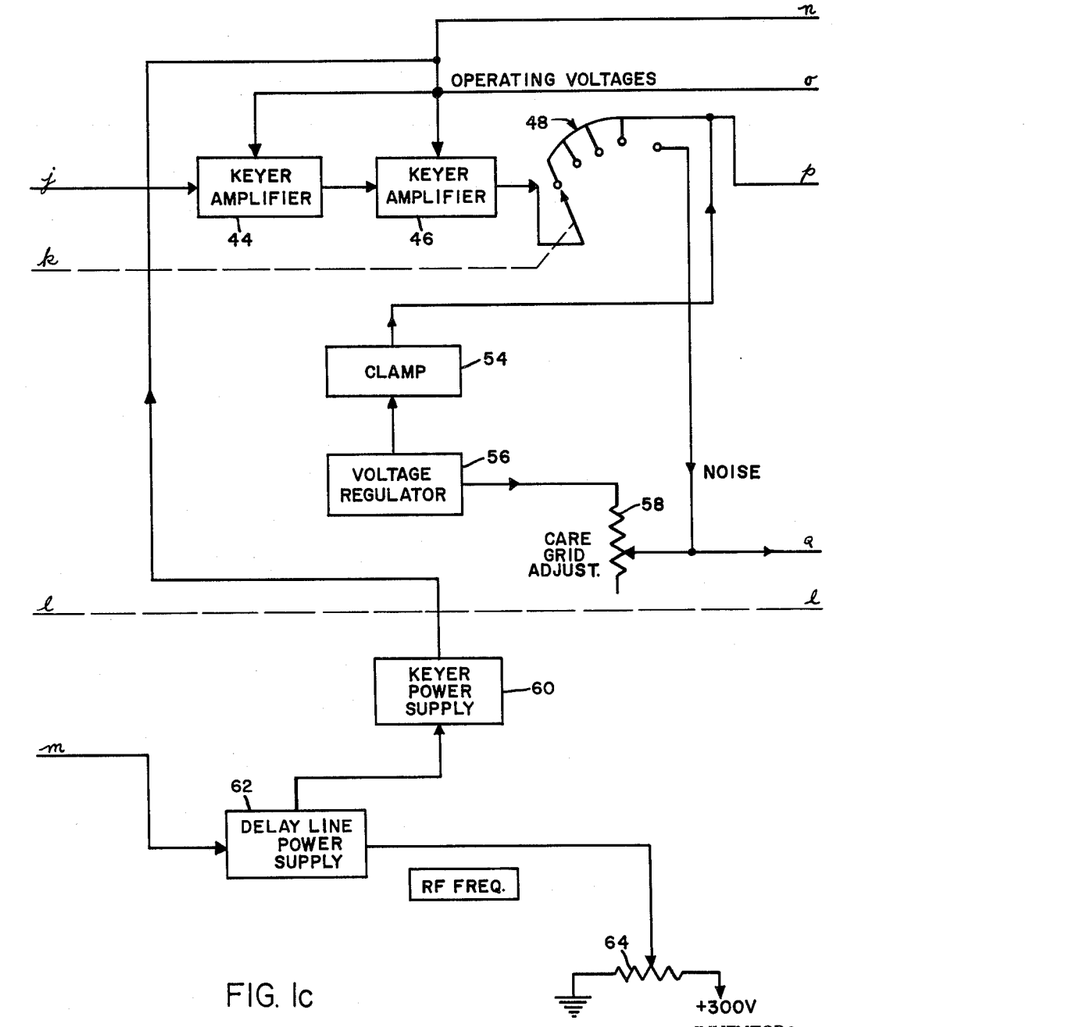
Figure 1D:
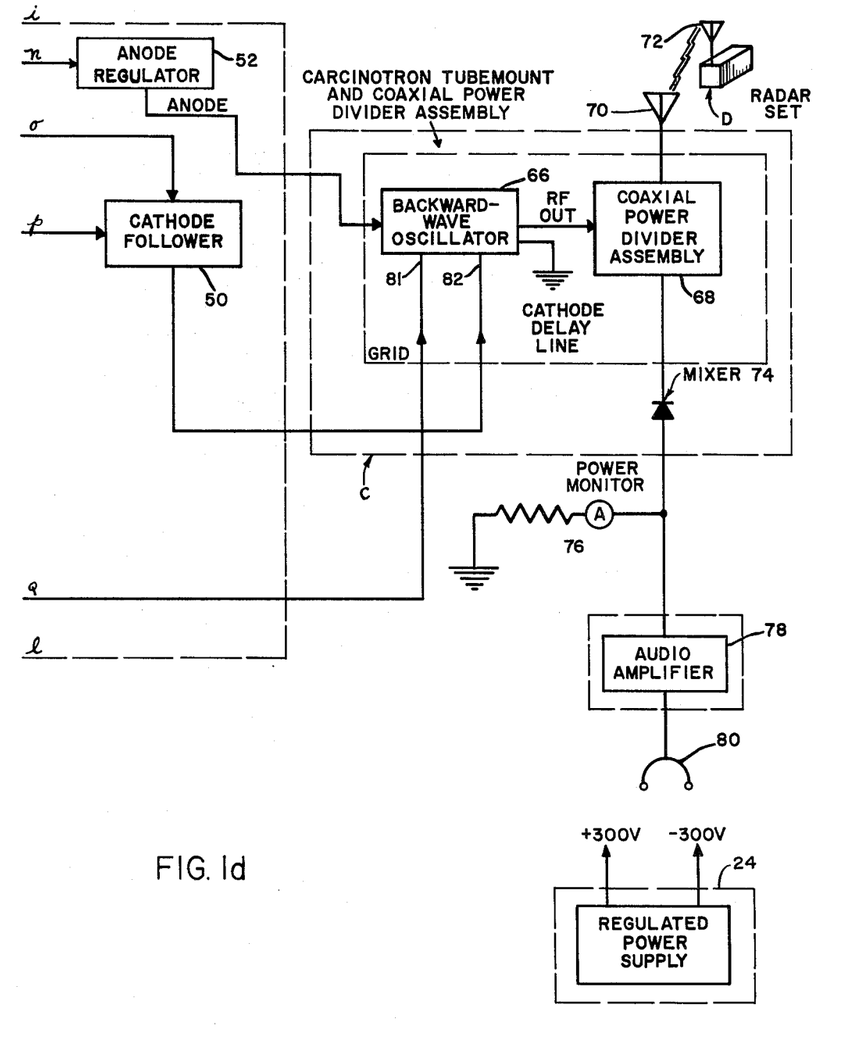
Figure 2A:
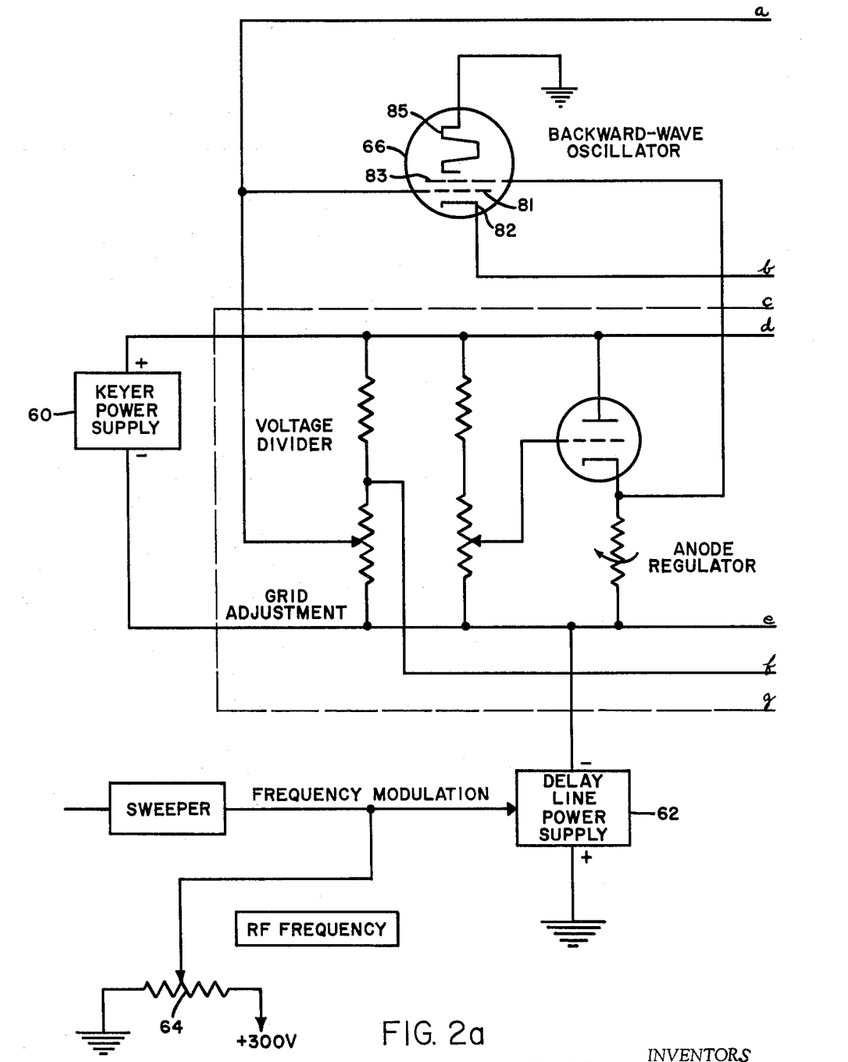
FIG. 2a and 2b is a combination block diagram and schematic of the keyer system.
Figure 2B:
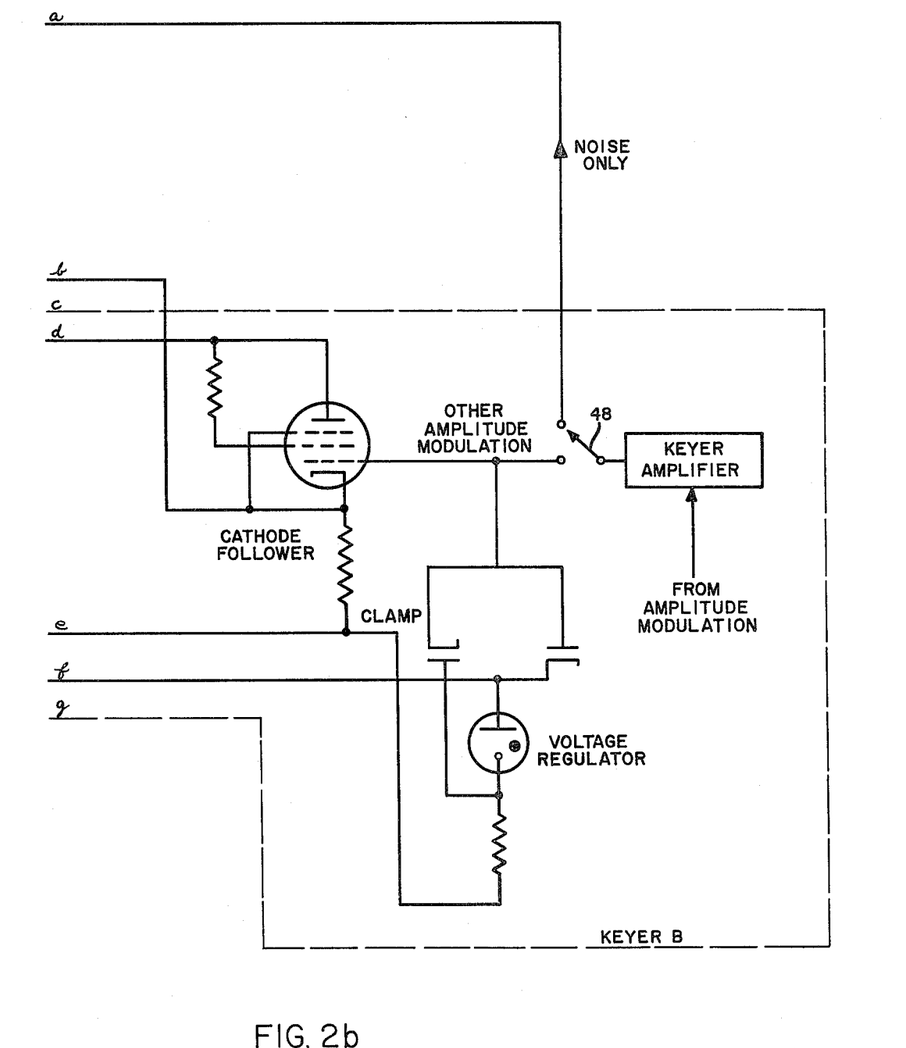

*Description of the keyer system—FIGS. 1 and 2*

The keyer circuit B, referring now to both to FIGS. 1 and 2 comprises: a rotary modulation selector switch 42 used to select the desired type of "amplitude" modulation such as sine, pulse, etc.; several cascaded keyer amplifiers 44 and 46 for amplifying the selected modulation signal; a cathode follower 50 whose output is coupled to the cathode 82 of the backward-wave oscillator 66; a second rotary switch 48, ganged to the first modulation selector switch 42 which shunts only the noise modulation signals to the grid 81 of the backward-wave oscillator, and directly couples the other forms of "amplitude" modulation signals to the cathode follower 50; a clamp 54 and voltage regulator 56, which for example may include a conventional two diode limiting circuit and a voltage regulating tube respectively, coupled to this second rotary switch 48 for limiting the grid-to-cathode voltage of the backward-wave oscillator 66 thereby preventing the backward-wave oscillator's grid 81 from swinging positive with respect to the cathode 82; a potentiometer 58 connected across the voltage regulator 56 for varying the D.-C. bias applied to the grid 81 of the backward-wave oscillator 66, and having the noise modulation signal, when such is selected, fed through the arm of the potentiometer 58 coupled to the grid 81; and an anode (collector) regulator 52 coupled to the anode 83 of the backward-wave oscillator 66 for regulating the voltage applied thereto.

In addition a keyer power supply unit 60 is directly coupled to the keyer amplifiers 44 and 46, the cathode follower 50, and the anode regulator 52 to provide the operating voltages therefore. A delay line power supply 62 is provided having an output voltage which is capable of being controlled by a both a D.-C. voltage, provided by the R.F. frequency potentiometer 64 which sets the frequency of the R.F. signal output of the backward-wave oscillator, and a frequency modulation signal. Both of said voltages are applied to the same point, as for example to the grid of a control tube in the power supply 62. The delay line power supply 62 is coupled to the keyer power supply 60 and more particularly to the lower, negative terminal of the keyer power supply 60. FIG. 2, shows, in more detail the particular connections between some of the various elements in the keyer system. The keyer power supply 60, providing the operating voltages, is shown in parallel with: a first voltage divider coupled to the grid 81 of the backward-wave oscillator 66 used to establish a particular desired D.-C. grid bias, which incorporates the grid potentiometer 58 previously described; an anode voltage regulator circuit 52, which is coupled to the anode 83; a cathode follower 50 having an output coupled to the cathode 82 of the backward-wave oscillator 66; a clamp 54 coupled to the input of the cathode follower 50 and to the output of the keyer amplifier 46 through the second rotary switch 48; and to a voltage regulator 56 coupled to the clamp 54 and to a portion of the voltage divider.

*Operation of the keyer system of FIGS. 1 and 2*

If "amplitude" modulation is selected by the instructor, the particular form of "amplitude" modulation so chosen is coupled through the rotary selector switch 42, and then subsequently amplified by the cascaded keyer amplifiers 44 and 46. The resulting "amplitude" modulation signal seen at the output of the second keyer amplifier 46 is applied through the second rotary switch 48 to the grid of the cathode follower 50 (except that if noise modulation is selected, the noise signals are applied directly through the switch 48 to the grid 81 of the backward-wave oscillator 66). Clamping means are provided at the input of the cathode follower 50 to obviate any positive backward-wave oscillator grid to cathode voltage, a condition which would damage the backward-wave oscillator 66. The resulting output signal from the cathode follower 50 is then directly applied to the cathode 82 of the backward-wave oscillator 66. This results in a corresponding change of voltage at the cathode 82, thus changing both the grid to cathode voltage and the delay line or helix voltage. The delay line or helix voltage is the voltage measured between the cathode element 82 and the helix or delay line element 85 of the backward-wave oscillator 66. The change in the grid to cathode voltage of the backward-wave oscillator 66 produces both amplitude modulation and an undesirable frequency shift of the backward-wave oscillator's output signal. Due to the particular arrangement of keyer B and associated circuitry, and because the amplitude modulation is applied to the cathode 82 of the backward-wave oscillator 66 there results the aforementioned corresponding change in delay line voltage, which has the effect of shifting the frequency of the backward-wave oscillator's output signal in a direction opposite to that which results from the change in the backward-wave oscillator's grid to cathode voltage, thereby cancelling out the original frequency shift. As previously stated when the noise form of modulation is selected, the noise signal is applied directly from the keyer amplifier 46 to the grid 82 of the backward-wave oscillator 66. The resultant frequency shift is not undesirable in this case because the noise signal itself contains components which include signals of all the frequencies that are within the bandwidth of the keyer amplifiers 44 and 46.

When a particular form of frequency modulation is selected by the instructor the chosen frequency modulation signal sweeps or varies the output voltage of the delay line power supply 62. But due to the particular arrangement of the components of the keyer system, only the delay line to cathode voltage of the backward-wave oscillator 66 changes, as the delay line power supply 62 is swept. The voltage measured between the cathode 82 and grid 81 of the backward-wave oscillator 66 is not changed by such frequency modulation, and therefore the backward-wave oscillator's output signal if frequency modulated without any undesirable amplitude distortion.

*Description by which operation of the R.F. section associated circuitry—FIG. 1*

The resulting modulated radio frequency output generated by the backward-wave oscillator 66 is then coupled to a conventional coaxial power divider 68, which passes most of the trainers modulated R.F. signal through a main branch thereof to the antenna 70 which propagates this jamming signal to the radar set's antenna 72. However, a portion of the same signal is also coupled through another branch to a mixer 74. This later signal is mixed with the received radar's signal detected by the trainer's antenna thereby providing a difference frequency signal which is in turn amplified by an audio amplifier means 78, connected to the mixer 74, to a level which can be heard in the detecting head set 80 coupled to the output of the audio amplifier means 78. Maximum audio signals are heard when the trainer and radar set signal frequencies are synchronously tuned.

Obviously many modifications and variations of the present invention are possible in the light of the above teachings. It is therefore to be understood that within the scope of the appended claims the invention may be practiced otherwise than as specifically described.

What is claimed is:

1. A keyer system comprising:
    first voltage means for generating a variable output voltage, having a control element therein for varying said output voltage;
    second voltage means for generating a fixed output voltage coupled in series with said first voltage means;
    first and second load means each respectively coupled across said fixed output voltage generated by said second voltage means;
    a backward-wave oscillator having a cathode, grid, anode, and delay line means,
    said cathode coupled to said second load means,
    said grid coupled to said first load means,
    said delay line coupled in series relationship with said first voltage means and at least a portion of said second voltage means;
    amplitude modulation signal generating means coupled to said second load means for varying said voltage at said point of coupling to thereby simultaneously amplitude modulate and frequency stabilize said backward-wave oscillator's output carrier wave;
    frequency modulation signal generating means coupled to said control element for varying the output voltage of said first voltage means thereby simultaneously varying the delay line to cathode voltage without affecting the grid to cathode voltage during a change in said second mean's output voltage.

2. The device as in claim 1, wherein said first load means includes a voltage divider network, and wherein said second load includes an amplifier.

3. The device as in claim 2, wherein both the first and second voltage means are direct current voltage means.

4. A keyer system comprising:
    a variable voltage source;
    means switchably coupled to said variable voltage source for controlling said source;
    fixed voltage source coupled at one end thereof to one end of said variable voltage source;
    first load means;
    second load means coupled at one end thereof to said one end of said fixed voltage supply and to one end of said first load means, and further coupled at its other end to the other end of said first load means and to the other end of said fixed voltage source;
    a backward-wave oscillator having a cathode, grid, anode, and delay line means, a said variable voltage source coupled to said delay line,
        said grid coupled to said first load means,
        said cathode coupled to said second load means;
    means switchably coupled to said second means for varying the voltage at said point of coupling.

5. In training systems the new and unusual result in the training of radar operators in de-jamming procedures characterized by the generation and electromagnetic propagation of simulated jamming signals in the direction of a radar set comprising:
    at least one radar set;
    a radar interference training device comprising,
        radar interference signal generating means including,
            means for generating a carrier were comprising,
                a backward-wave oscillator, including a carcinotron having an anode cathode means, a grid control means, a cathode control means, and a delay line means, a variable selectively operable amplitude modulation signal generating means, switchably coupled to said cathode control means, a variably selectively operably frequency operation modulation signal generating means comprising, a variable selectively operably triangular waveform generator, a variable regulated power supply means switchably coupled at its input to the triangular waveform generator, and its output coupled to the grid and cathode control means, a directive electromagnetic propagation means coupled to said radar interference signal generating means for radiating said interference signals toward said radar set's receiving antenna and receiving a portion of said radar set's carrier signal located approximately less than 100 feet from the radar set's receiving antenna, and means coupled to said directive electromagnetic propagation means and said radar interference signal generating means for determining when the carrier frequencies of said radar set and said training device are substantially in synchronism comprising, means for sampling both said radar and trainer carrier frequencies, mixing means coupled to said sampling means thereby providing a resulting difference frequency signal, audio amplifier means directly coupled to said mixing means for amplifying said resultant difference frequency signal, and monitoring means coupled to said audio amplifier.

6. In training systems the new and unusual result in the training of radar operators in de-jamming procedures characterized by the generation and electromagnetic propagation of simulated jamming signals in the direction of a radar set comprising:

at least one radar set;

a radar interference training device comprising, radar interference signal generating means including, means for generating a carrier wave comprising, a backward-wave oscillator including a carcinotron having grid control and cathode control elements;

a variable selectively operable amplitude modulation signal generating means providing at least sine, pulse, square, continuous wave and noise modulation signals;

switch means selectively coupling one of said amplitude modulation signals to one of said control elements, said sine, pulse, square, cw modulation signals being coupled to said cathode control element when switched and said noise modulation signals being coupled to said grid control element when switched, a variable regulated power supply means switchably coupled at its input to the triangular waveform generator, and its output coupled to the grid and cathode control means, a directive electromagnetic propagation means coupled to said radar interference signal generating means for radiating said interference signals toward said radar set's receiving antenna and receiving a portion of said radar set's carrier signal located approximately less than 100 feet from the radar set's receiving antenna, and means coupled to said directive electromagnetic propagation means and said radar interference signal generating means for determining when the carrier frequencies of said radar set and said training device are substantially in synchronism comprising, means for sampling both said radar and trainer carrier frequencies, mixing means coupled to said sampling means thereby providing a resulting difference frequency signal, audio amplifier means directly coupled to said mixing means for amplifying said resultant difference frequency signal, and monitoring means coupled to said audio amplifier.

7. In training systems the new and unusual result in the training of radar operators in de-jamming procedures characterized by the generation and electromagnetic propagation of simulated jamming signals in the direction of a radar set comprising:

at least one radar set;

a radar interference training device comprising, radar interference signal generating means including, means for generating a carrier wave comprising, a backward-wave oscillator including a caricinotron having grid control and cathode control elements, a keyer means having a first and second load means in parallel with one another, a variable selectively operable amplitude modulation signal generating means switchably coupled to said first load means, a fixed regulated keyer power supply means coupled to said keyer for supplying operating voltages therefor, a variable regulated delay line power supply means coupled at one end to both said fixed keyer power supply means and said keyer means, and coupled at its other end to said delay line means, a variable selectively operable frequency modulation signal generating means switchably coupled to said delay line supply means for varying said delay line's voltage comprising, a variable selectively operable triangular waveform generator, means for coupling said first load means to said means to said cathode means;

means for coupling said second load means to said grid means, a directive electromagnetic propagation means coupled to said radar interference signal generating means for radiating said interference signals toward said radar set's receiving antenna and receiving a portion of said radar set's carrier signal located approximately less than 100 feet from the radar set's receiving antenna, and means coupled to said directive electromagnetic propagation means and said radar interference signal means for determining when the carrier frequencies of said radar set and said training device are substantially in synchronism comprising, means for sampling both said radar and trainer carrier frequencies,
mixing means coupled to said sampling means thereby providing a resulting difference frequency signal,
audio amplifier means directly coupled to said mixing means for amplifying said resultant difference frequency signal, and
monitoring means coupled to said audio amplifier.

References Cited by the Examiner

UNITED STATES PATENTS

| | | | |
|---|---|---|---|
| 2,567,261 | 9/1951 | Williams | 325—132 X |
| 2,705,752 | 4/1955 | Pound | 325—20 X |
| 3,038,067 | 6/1962 | Dench et al. | 325—132 X |
| 3,072,864 | 1/1963 | Alexis et al. | 325—25 X |

MAYNARD R. WILBUR, *Primary Examiner.*